United States Patent
Kim et al.

(10) Patent No.: US 11,244,671 B2
(45) Date of Patent: Feb. 8, 2022

(54) MODEL TRAINING METHOD AND APPARATUS

(71) Applicant: Samsung Electronics Co., Ltd., Suwon-si (KR)

(72) Inventors: Hogyeong Kim, Daejeon (KR); Hyohyeong Kang, Hwaseong-si (KR); Hwidong Na, Seongnam-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 16/549,236

(22) Filed: Aug. 23, 2019

(65) Prior Publication Data

US 2020/0357384 A1   Nov. 12, 2020

(30) Foreign Application Priority Data

May 9, 2019   (KR) .......................... 10-2019-0054350

(51) Int. Cl.
*G10L 15/00* (2013.01)
*G10L 15/06* (2013.01)
*G10L 15/16* (2006.01)
*G06N 3/08* (2006.01)

(52) U.S. Cl.
CPC .............. *G10L 15/063* (2013.01); *G06N 3/08* (2013.01); *G10L 15/16* (2013.01)

(58) Field of Classification Search
CPC ..... G10L 15/063; G10L 15/16; G10L 15/183; G06N 3/08; G06N 3/0445; G06N 3/088; G06N 3/084; G06N 3/0454; G06N 20/20

USPC .............................................. 704/232; 703/6
See application file for complete search history.

(56) References Cited

U.S. PATENT DOCUMENTS

| | | | |
|---|---|---|---|
| 10,079,022 B2 * | 9/2018 | Kim | ................. G10L 15/183 |
| 10,607,598 B1 * | 3/2020 | Larson | ................. G10L 15/063 |
| 2017/0024641 A1 | 1/2017 | Wierzynski | |
| 2018/0232604 A1 | 8/2018 | Seybold | |
| 2018/0260705 A1 | 9/2018 | Puzis et al. | |
| 2018/0268292 A1 | 9/2018 | Choi et al. | |
| 2019/0051290 A1 | 2/2019 | Li et al. | |
| 2019/0065901 A1 | 2/2019 | Amato et al. | |
| 2019/0087726 A1 | 3/2019 | Greenblatt et al. | |

(Continued)

FOREIGN PATENT DOCUMENTS

| | | |
|---|---|---|
| KR | 10-2017-0034258 A | 3/2017 |
| WO | WO 2019/032723 A1 | 2/2019 |
| WO | WO 2019/051359 A1 | 3/2019 |

OTHER PUBLICATIONS

Goodfellow, Ian, et al., "Generative Adversarial Nets.", *Advances in neural information processing systems*, Jun. 10, 2014 (pp. 1-9).

(Continued)

*Primary Examiner* — Charlotte M Baker
(74) *Attorney, Agent, or Firm* — NSIP Law (57) ABSTRACT

A model training method and apparatus is disclosed, where the model training method acquires first output data of a student model for first input data and second output data of a teacher model for second input data and trains the student model such that the first output data and the second output data are not distinguished from each other. The student model and the teacher model have different structures.

20 Claims, 8 Drawing Sheets

(56) References Cited

U.S. PATENT DOCUMENTS

2020/0279279 A1\* 9/2020 Chaudhuri .......... G06K 9/00335
2020/0293875 A1\* 9/2020 Zhang ................. G10L 21/0208

OTHER PUBLICATIONS

Hinton, Geoffrey et al., "Distilling the Nnowledge in a Neural Network", *arXiv preprint arXiv:1503.02531*, Mar. 9, 2015 (pp. 1-9).
Wang, Xiaojie, et al., "KDGAN: Knowledge Distillation with Generative Adversarial Networks." *Advances in Neural Information Processing Systems*, 2018 (pp. 1-12).
Hu, Zhiting, et al. "Harnessing Deep Neural Networks with Logic Rules.", *arXiv preprint arXiv:1603.06318*, Mar. 26, 2019 (pp. 1-20).

\* cited by examiner

[Algorithm] Minibatch SGD training of generative adversarial nets.

for number of training epochs do for number of training steps for the discriminator do
- Sample minibatch of $m$ noise samples $\{x_1, \ldots, x_m\}$ from noise prior $p_x(x)$
- Sample minibatch of $m$ examples $\{y_1, \ldots, y_m\}$ from data generating distribution $p_{LM}(y)$
- Update the discriminator by ascending its stochastic gradient:
$$\nabla_{\theta_d} \frac{1}{m} \sum_{i=1}^{m} \left[ \log D(y_i) + \log\left(1 - D(G(x_i))\right) \right]$$

end for for number of training steps for the generator do
- Sample minibatch of $m$ noise samples $\{x_1, \ldots, x_m\}$ from noise prior $p_x(x)$
- Update the generator by descending its stochastic gradient:
$$\nabla_{\theta_g} \frac{1}{m} \sum_{i=1}^{m} \log\left(1 - D(G(x_i))\right)$$

end for end for

MODEL TRAINING METHOD AND APPARATUS

CROSS-REFERENCE TO RELATED APPLICATIONS

This application claims the benefit under 35 USC § 119(a) of Korean Patent Application No. 10-2019-0054350 filed on May 9, 2019 in the Korean Intellectual Property Office, the entire disclosure of which is incorporated herein by reference for all purposes.

BACKGROUND

1. Field

The following description relates to a model training method and apparatus.

2. Description of Related Art

Research is being actively conducted to classify input patterns in groups so that efficient pattern recognition may be performed on computers. This includes research on an artificial neural network (ANN) that is obtained by modeling pattern recognition characteristics using mathematical expressions through a processor-implemented neural network model, as a specialized computational architecture, which after substantial training may provide computationally intuitive mappings between input patterns and output patterns. The ANN generates mapping between input patterns and output patterns using an algorithm, and a capability of generating the mapping is expressed as a learning capability of the ANN. The ANN may employ an algorithm that mimics abilities to learn. Also, the ANN has a capability to generate a relatively correct output with respect to an input pattern that has not been used for training based on a result of previous training. However, because such operations or applications are performed through specialized computation architecture, and in different automated manners than they would have been performed in non-computer implemented or non-automated approaches, they also invite problems or drawbacks that only occur because of the automated and specialized computational architecture on which they are implement.

Further, studies are being made to maximize the recognition rate of the ANN while miniaturizing the size of the ANN.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of training a model, the method including acquiring first output data of a student model for first input data and second output data of a teacher model for second input data, and training the student model such that the first output data and the second output data are not distinguished from each other, wherein the student model and the teacher model have different structures.

The student model and the teacher model may be configured to process different tasks.

The first input data and the second input data may be different types of data.

The first input data and the second input data may be unlabeled data.

The training of the student model may include training the student model such that the first output data and the second output data may be not distinguished from each other by a discriminator model and the discriminator model may be configured to distinguish between the first output data and the second output data.

The first output data and the second output data may be a same type of data.

The student model may be a speech recognition model and the teacher model may be a language model that outputs text data based on an expression of a domain.

The first input data, the second input data, the first output data, and the second output data may be sequence data.

The training of the student model may include determining an adversarial loss based on a degree to which the first output data and the second output data may be distinguished from each other and training the student model to reduce the adversarial loss.

In another general aspect, there is provided an apparatus for training a model, the apparatus including, a processor configured to acquire first output data of a student model for first input data and second output data of a teacher model for second input data and to train the student model such that the first output data and the second output data are not distinguished from each other, and a memory configured to store a parameter of the student model, wherein the student model and the teacher model have different structures.

The student model and the teacher model may be configured to process different tasks.

The first input data and the second input data may be different types of data.

The first input data and the second input data may be unlabeled data.

The processor may be configured to train the student model such that the first output data and the second output data may be not distinguished from each other by a discriminator model and the discriminator model may be configured to distinguish between the first output data and the second output data.

The first output data and the second output data may be a same type of data.

The student model may be a speech recognition model, and the teacher model may be a language model that outputs text data based on an expression of a domain.

In another general aspect, there is provided an apparatus for training a model, the apparatus including a memory configured to store a student model, a teacher model, and a discriminator model, and a processor configured to acquire first output data of the student model for first input data and second output data of the teacher model for second input data, train the discriminator model to distinguish between the first output data and the second output data, and train the student model to minimize a distinction between the first output data and the second output data at the discriminator mode.

A number of hidden layers of the student model may be lesser than a number of hidden layers of the teacher model.

The first input data and the second output data comprise unlabeled data.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

Figure 1:
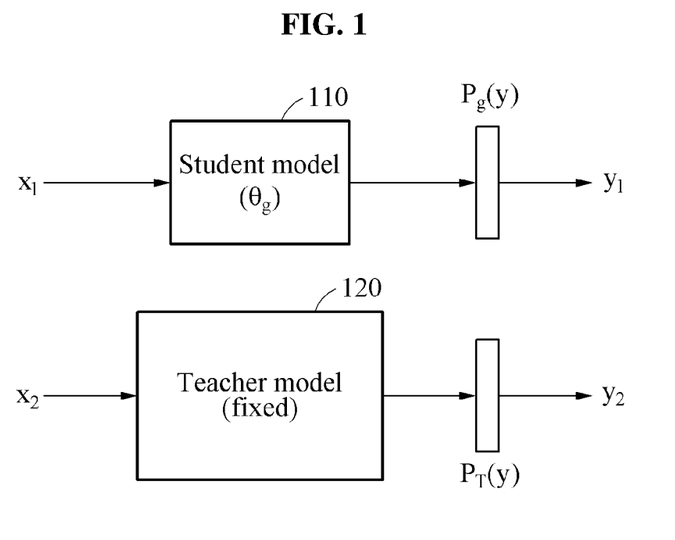
FIG. 1 illustrates an example of a teacher model and a student model.

FIG. 1 illustrates an example of a student model and a teacher model.

FIG. 1 illustrates a student model 110 and a teacher model 120.

In an example, the student model 110 and the teacher model 120 are neural networks having difference sizes. The student model 110 is trained based on the teacher model 120. In an example, the neural network is a recognition model using numerous artificial neurons connected through edges.

The teacher model 120 is a model that recognizes target data to be recognized, with a high accuracy using sufficiently numerous characteristics extracted from the target data. The teacher model 120 is greater in size than the student model 110. For example, the teacher model 120 may include more layers, more nodes, or combinations of thereof when compared to the student model 110.

The student model 110 is a neural network having a size smaller than that of the teacher model 120. The student model 110 uses less memory than the teacher model 120 and has a faster recognition speed due to its smaller size. The student model 110 is trained to mimic a high-accuracy cognitive ability of the teacher model 120. Output data output from each model may be, for example, a value of logit and a probability value output from the corresponding model.

The student model 110 and the teacher model 120 are neural networks having different structures, for example, knowledge structures. The student model 110 and the teacher model 120 process different tasks. For example, the student model 110 is a speech recognition model and the teacher model 120 is a language model. The speech recognition model is a model that converts input speech data into text data to be output. The language model is a model that measures a probability that a sentence actually exists or how natural a sentence is. For example, the language model scores a given sentence by measuring a degree to which the sentence is correct grammatically or semantically, and generates a new sentence by estimating a next possible word based on the given sentence or word.

In an example, input data $x_1$ and $x_2$ respectively input to the student model 110 and the teacher model 120 may be different types of data. For example, first input data, for example, input data $x_1$ that is input to the student model 110 is speech data and second input data, for example, input data $x_2$ that is input to the teacher model 120 is text data. Also, the input data $x_1$ and $x_2$ are unlabeled data, for example, data without correct answer labels of the input data $x_1$ and $x_2$.

In an example, the input data $x_1$ and $x_2$ are sequence data including a plurality of elements. For example, the sequence data includes sentence data including a plurality of words or speech data including a plurality of frames. In an example, the sentence data is also referred to as text data including a plurality of words, and a frame indicates data obtained by sampling the speech data in a length, for example, in units of frame. In an example, the length of the frames may be determined in advance.

In FIG. 1, $p_g(y)$ denotes a probability distribution output from the student model 110 and $p_T(y)$ denotes a probability distribution output from the teacher model 120. $y_1$ denotes data sampled at a highest probability in the probability distribution $p_g(y)$ of the student model 110, and $y_2$ denotes data sampled at a highest probability in the probability distribution $p_T(y)$ of the teacher model 120. Output data $y_1$ and $y_2$ respectively sampled in the student model 110 and the teacher model 120 are a same type of data. For example, the output data $y_1$ and $y_2$ are text data. In FIG. 1, $\theta_g$ denotes parameters of the student model 110.

In an example, the teacher model 120 corresponding to the language model is used to train the student model 110 corresponding to the speech recognition model, so that the student model 110 is trained to output a natural sentence similarly to the teacher model 120. Through this, the student model 110 is obtained, which not only performs a function of the speech recognition model but also a function of the language model. As a result, the speech recognition model with a fast inference time and an accurate recognition performance may be expected.

A scheme for training the student model 110 using the teacher model 120 is referred to as "model compression". In the model compression, the teacher model 120 is fixed and is not trained. A method of training the student model 110 will be described in detail with reference to the following drawings.

The student model 110 and the teacher model 120 may be trained to perform a desired operation by mapping input data and output data that have a nonlinear relationship therebetween through deep learning to perform tasks such as, for example, object classification, object recognition, audio or speech recognition, and image recognition. The deep learning is a machine learning method used to solve a problem given from a big dataset. The deep learning may also be construed as a problem-solving process for optimization to find a point where energy is minimized while training the neural network using provided training data. Through the deep learning, for example, supervised or unsupervised learning, a weight corresponding to an architecture or a model of the neural network may be obtained, and the input data and the output data may be mapped to each other based on the obtained weight.

In an example, the student model 110 and the teacher model 120 may be implemented as an architecture having a plurality of layers including an input image, feature maps, and an output. In the student model 110 and the teacher model 120, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

In another example, the student model 110 and the teacher model 120 may include an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network. Input data for the student model 110 and the teacher model 120 may include image data, voice data, and text data. However, they are provided as examples only, and other types of data are considered to be well within the scope of the present disclosure.

Figure 2:
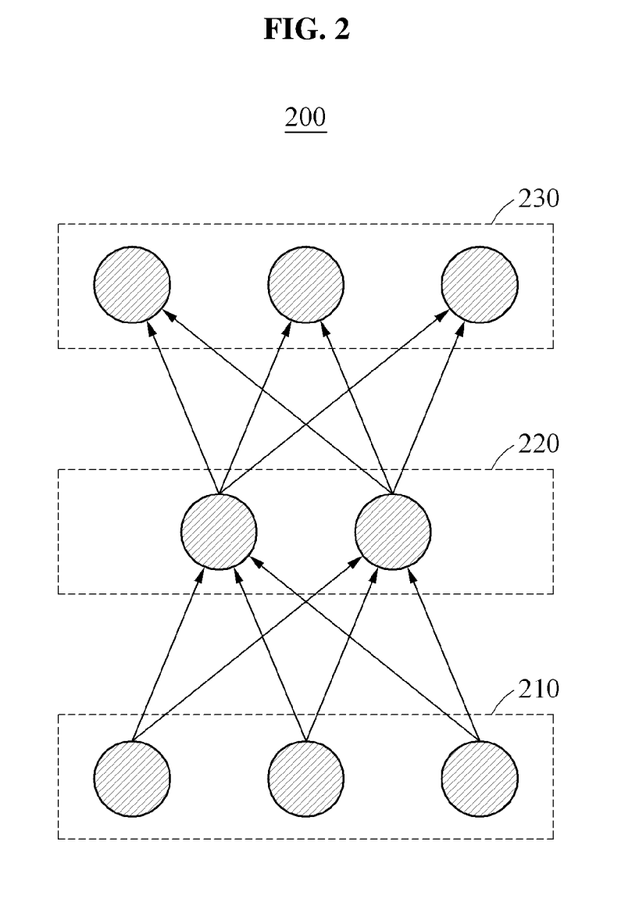
FIG. 2 illustrates an example of a neural network as an example of a teacher model and a student model.

FIG. 2 illustrates an example of a neural network as an example of a teacher model and a student model.

In an example, the student model 110 and the teacher model 120 are neural networks of different sizes. A method and apparatus for recognizing data based on a neural network is suggested and a method and apparatus for training the neural network is suggested. The term "recognition" includes verification and identification. The verification is an operation of determining whether input data is true of false. For example, verification may be an operation of determining whether input data is true or false, and identification may be an operation of determining a label indicated by input data from among a plurality of labels. For example, the neural network is a model that receives a sequence and performs operations such as, for example, translation, interpretation, and speech recognition.

In an example, the student model 110 and the teacher model 120 may correspond to a recurrent neural network (RNN) or a convolutional neural network (CNN). In an example, the CNN may be a deep neural network (DNN). Ain an example, the DNN may include a region proposal network (RPN), a classification network, a reinforcement learning network, a fully-connected network (FCN), a deep convolutional network (DCN), a long-short term memory (LSTM) network, and a grated recurrent units (GRUs). The DNN may include a plurality of layers. The plurality of layers may include an input layer 210, at least one hidden layer 220, and an output layer 230. In an example, neural network may include a sub-sampling layer, a pooling layer, a fully connected layer, etc., in addition to a convolution layer.

A neural network 200 includes a plurality of layers, each including a plurality of nodes. Also, the neural network 200 includes connection weights that connect the plurality of nodes included in each of the plurality of layers to a node included in another layer.

The neural network 200 includes, for example, an input layer 210, a hidden layer 220, and an output layer 230. The input layer 210 receives an input for performing training or recognition and transfers the input to the hidden layer 220. The output layer 230 generates an output of the neural network 200 based on a signal received from the hidden layer 220. The hidden layer 220 is interposed between the input layer 210 and the output layer 230, and changes data transferred though the input layer 210 to a value that is easy to predict.

Input nodes included in the input layer 210 and hidden nodes included in the hidden layer 220 are connected through edges having connection weights. The hidden nodes included in the hidden layer 220 and output nodes included in the output layer 230 are connected through edges having connection weights.

The neural network 200 may include a plurality of hidden layers. The neural network 200 including the plurality of hidden layers is referred to as a deep neural network. Training of the deep neural network is referred to as deep learning. For example, the teacher model 120 greater in size than the student model 110 may include a greater number of hidden layers as compared to the student model 110.

In an example, a model training apparatus uses a gradient descent scheme based on output values of nodes included in the neural network 200 and a loss that is back-propagated to the neural network 200, to determine parameters of the nodes. For example, the model training apparatus updates connection weights between the nodes through loss back-propagation learning. The loss back-propagation learning is a method of estimating a loss by performing forward computation on given training data, propagating the estimated loss in a reverse direction from the output layer 230 toward the hidden layer 220 and the input layer 210, and updating the connection weights to reduce the loss. A processing of the neural network 200 is performed in a direction from the input layer 210 toward the hidden layer 220 and the output layer 230. In the loss back-propagation training, the update of the connection weights is performed in the direction from the output layer 230, toward the hidden layer 220 and to the input layer 210. One or more processors may use a buffer memory that stores a layer or a series of computation data to process the neural network 200 in a desired direction.

The model training apparatus defines an objective function for measuring a degree to which currently set connection weights are close to optimum, continuously changes the connection weights based on a result of the objective function, and repetitively performs the training. The objective function is, for example, a loss function for calculating a loss between an actual output value output by the neural network 200 based on the training input of the training data and a desired expected value to be output, for example, the training output. The model training apparatus updates the connection weights to reduce a value of the loss function. An example of the loss function will be described in detail with reference to FIG. 3.

Figure 3:
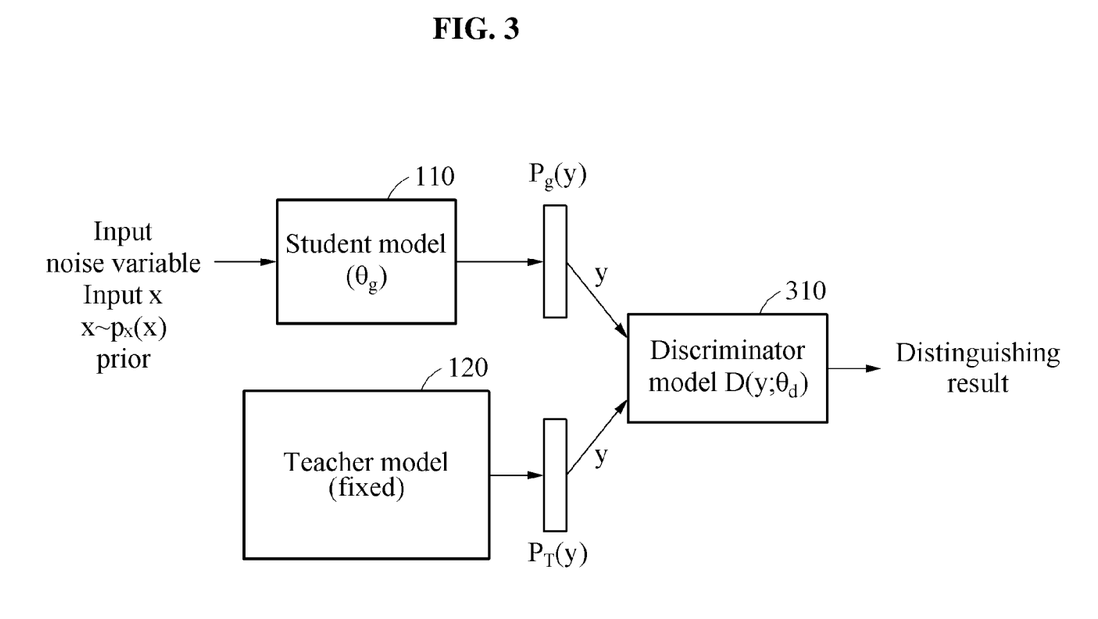
FIGS. 3 through 5 illustrate examples of a process of training a student model.
Figure 4:
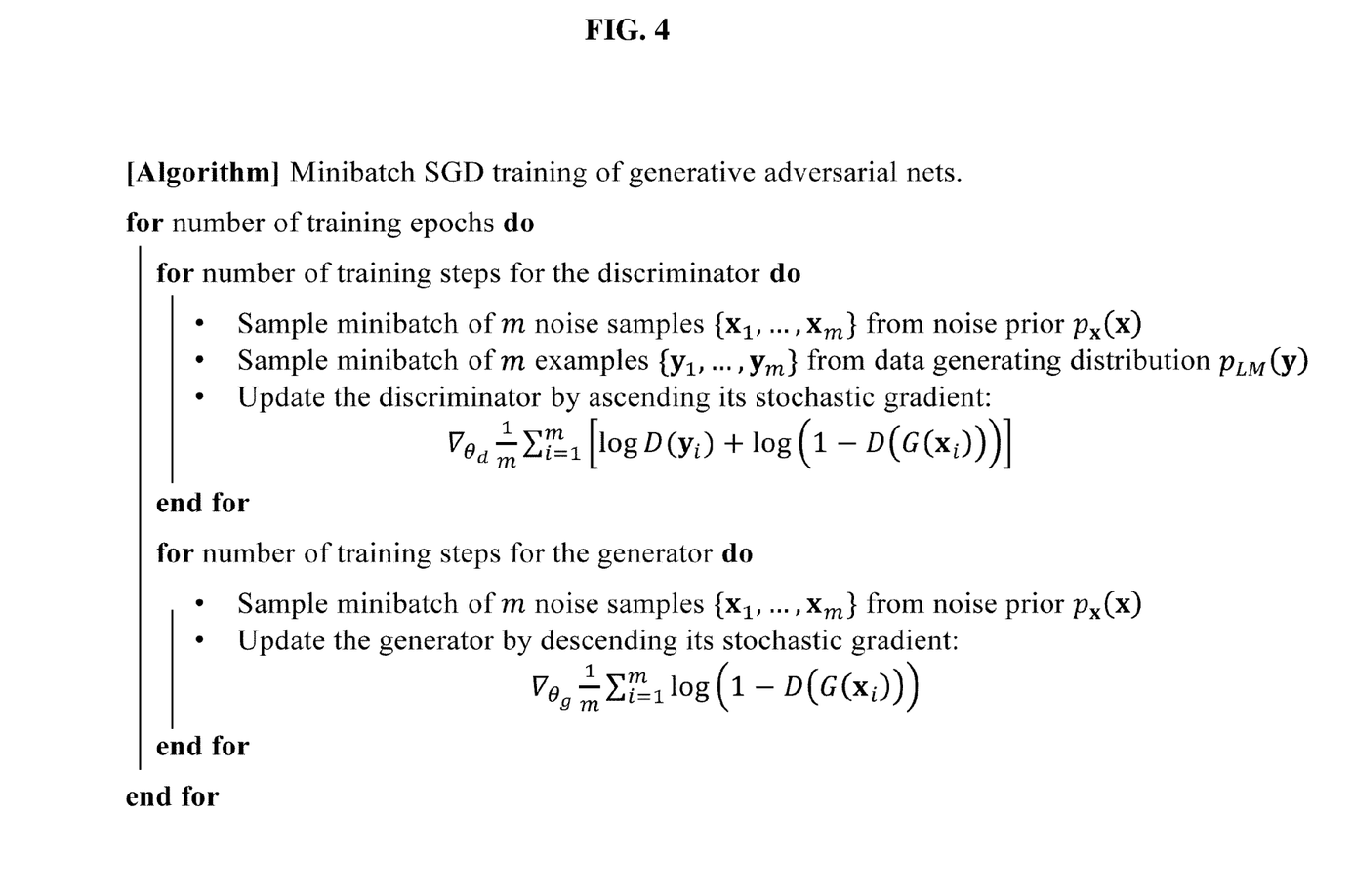
Figure 5:
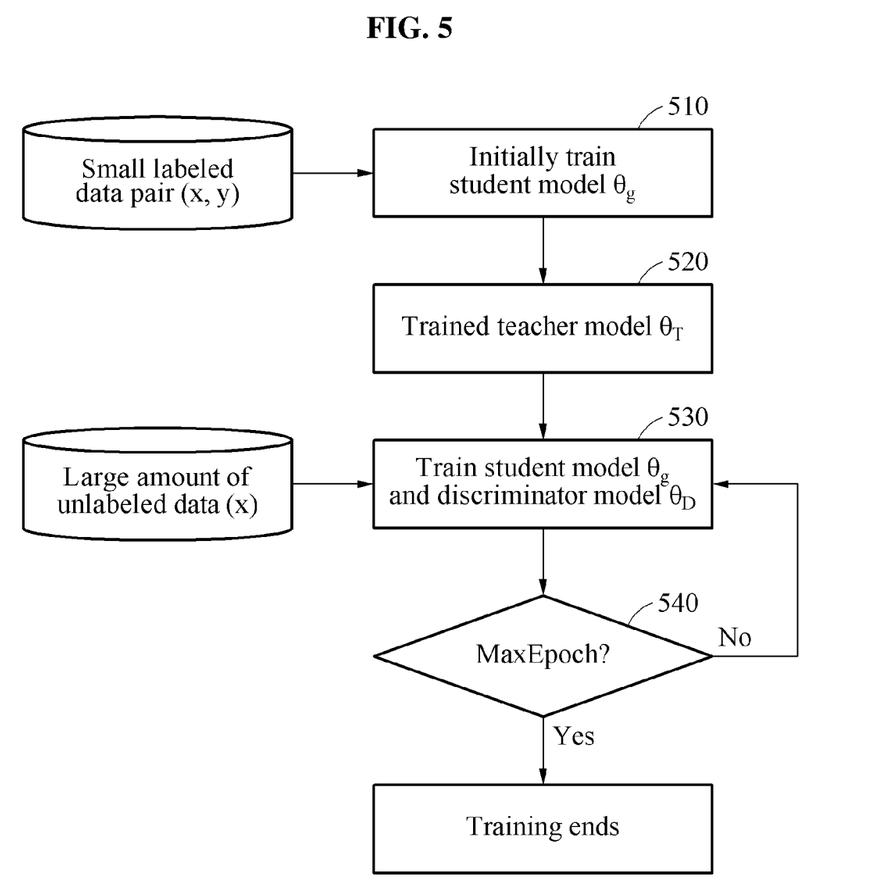

FIGS. 3 through 5 illustrate examples of a process of training a student model.

FIG. 3 illustrates a student model 110, a teacher model 120, and a discriminator model 310. For ease of description, data input to the student model 110 is referred to as first input data, data output from the student model 110 is referred to as first output data, data input to the teacher model 120 is referred to as second input data, and data output from the teacher model 120 is referred to as second output data.

The discriminator model 310 is a neural network that distinguishes between the first output data of the student model 110 and the second output data of the teacher model 120, and may include, for example, convolutional neural networks (CNN), recurrent neural networks (RNN), multi-layer perceptron (MLP), and self-attention. In an example, the discriminator model 310 is a model that distinguish the first output data of the student model 110 as false and distinguishes the second output data of the teacher model 120 as true. In an example, the student model 110 is a model that generates fake data for deceiving the discriminator model 310. The student model 110 is also referred to as a generator model. The teacher model 120 is a pre-trained model and used to train the student model 110 using the discriminator model 310 based on a result of a sampling in the teacher model 120 as real data.

In a training process, the discriminator model 310 is trained to distinguish the first output data of the student model 110 as false and distinguish the second output data of the teacher model 120 as true. Also, the student model 110 is trained such that output data of the student model 110 and output data of the teacher model 120 are not distinguished from each other by the discriminator model 310. As such, a training in which two models are trained while competing against each other is referred to as an adversarial training. A loss function used in the training is expressed by Equation 1 below. The adversarial training is also referred to as generative adversarial networks (GAN) for ease of description.

$$\min_G \max_D V(D, G) = \mathbb{E}_{y \sim p_T(y)}[\log D(y)] + \mathbb{E}_{x \sim p_x(x)}[\log(1 - D(G(x)))]$$ [Equation 1]

In Equation 1, D denotes the discriminator model 310 and G denotes the student model 110. Also, D(y) denotes a probability variable that distinguishes whether data input to the discriminator model 310 is generated in the student model 110 or the teacher model 120, and G(x) denotes a probability variable output from the student model 110. $\mathbb{E}$ denotes an expectation, $\sim p_T(y)$ indicates that data input to the discriminator model 31 is output from the teacher model 120, and $\sim p_x(x)$ indicates that data input to the discriminator model 31 is output from the student model 110.

In the adversarial training, the student model 110 is trained such that two expectation terms included in Equation 1 are reduced, and the discriminator model 310 is trained such that a second term of expectation terms included in Equation 1 is increased. Through such process, the student model 110 is trained to output the same output data as the teacher model 120 at a degree such that it is difficult for the discriminator model 310 to distinguish between the two.

In an example, such training process is used to train the student model 110 to output a recognition result that is specialized for a particular domain. In one example, the domain represents a field that is different from other fields such as medical field, engineering field, economic field. The domain may have idiomatic expressions frequently used in the particular field. Thus, a related field may be taken into consideration when outputting the recognition result. For example, when the teacher model 120 is a language model specialized in the medical field, the teacher model 120 and the discriminator model 310 are used to train the student model 110 corresponding to the speech recognition model, thereby obtaining a speech recognition model that outputs a recognition result in expressions, patterns, and/or words specialized in the medical field. In this example, the teacher model 120 is a language model trained using text data of the medical field, for example, medical paper.

In another example, the domain represents a language of a region such as English, Japanese, and Chinese. The domain may have idiomatic expressions that are frequently used in the region. For example, when the teacher model 120 is a language model specialized in an English field and the student model 110 is a Korean-to-English translation model, the student model 110 is trained based on the teacher model 120 so as to efficiently obtain a translation model that outputs a translation result in idiomatic and natural expressions, patterns, and/or words which are frequently used in English speaking regions. In this example, the teacher model 120 is a language model trained using text data in English. In another example, the foregoing may also be applicable to a case in which the student model 110 is a communication model.

As described above, since the training is based on distinguishing whether the data input to the discriminator model 310 is generated in the student model 110 or generated in the teacher model 120, a correct answer label of the first input data x, which is input to the student model 110 is not needed. Also, the first input data input that is to the student model 110 and the second input data input to the teacher model 120 may not have to be a pair. Since the student model 110 is trained using unlabeled data, a large quantity of unlabeled data may be usefully applied to the training, and thus, a significant cost for acquiring a correct answer for the unlabeled data is not incurred. Also, since whether the data input to the discriminator model 310 is generated in the student model 110 or generated in the teacher model 120 is distinguished in the discriminator model 310, the student model 110 and the teacher model 120 only need to output the same type of output data and do not need to receive the same type of input data. Accordingly, different types of data may be input to the student model 110 and the teacher model 120, the student model 110 and the teacher model 120 may have different knowledge structures, and the student model 110 and the teacher model 120 may process different tasks.

FIG. 4 illustrates an example of an algorithm for training a student model and a discriminator model. In the example of FIG. 4, a discriminator corresponds to the discriminator model and a generator corresponds to the student model.

FIG. 5 is a diagram illustrating an example of an overall training process. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5 and are incorporated herein by reference. Thus, the above description may not be repeated here.

In operation 510, a student model is initially trained using a small amount of labeled data pair x, y. In operation 520, a pre-trained teacher model is acquired. In operation 530, the student model and a discriminator model are simultaneously trained using a large amount of unlabeled data x. In operation 540, it is confirmed whether the training is performed by a preset maximum (max) epoch. When the training is not performed by a preset max epoch, operation 530 is performed again. When the training is performed for a preset max epoch, the training ends.

As such, even when the student model 110 and the teacher model 120 have different knowledge structures, knowledge of the teacher model 120 is transferred to the student model 110 and a scheme for performing training using unlabeled data is provided. By using the discriminator model 310 corresponding to an external neural network, the student model 110 operating as a generator model may be improved. In this example, the teacher model 120 is fixed and performs only a function of transferring knowledge to the student model 110.

Figure 6:
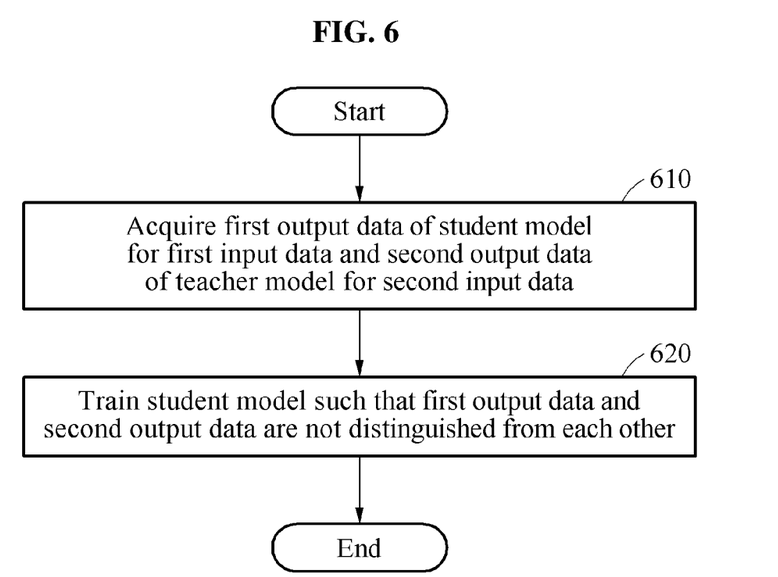
FIG. 6 illustrates an example of a model training method.

FIG. 6 illustrates an example of a model training method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-5 are also applicable to FIG. 6 and are incorporated herein by reference. Thus, the above description may not be repeated here.

Referring to FIG. 6, the model training method is performed in a processor included in a model training apparatus.

In operation 610, the model training apparatus acquires first output data of a student model for first input data and second output data of a teacher model for second input data. The student model and the teacher model process different tasks. The first input data and the second input data are different types of data. The first input data and the second input data are unlabeled data. The first output data and the second output data are a same type of data.

In operation 620, the model training apparatus trains the student model such that the first output data and the second output data are not distinguished from each other. The model training apparatus trains the student model such that the first output data and the second output data are not distinguished from each other by a discriminator model. The model training apparatus trains the discriminator model to distinguish between the first output data and the second output data. The model training apparatus determines an adversarial loss based on a degree to which the first output data and the second output data are distinguished from each other and trains the student model such that the adversarial loss is reduced.

For example, the student model is a speech recognition model and the teacher model is a language model that outputs text data based on an expression specialized in a predetermined domain. The first input data, the second input data, the first output data, and the second output data are sequence data.

Figure 7:
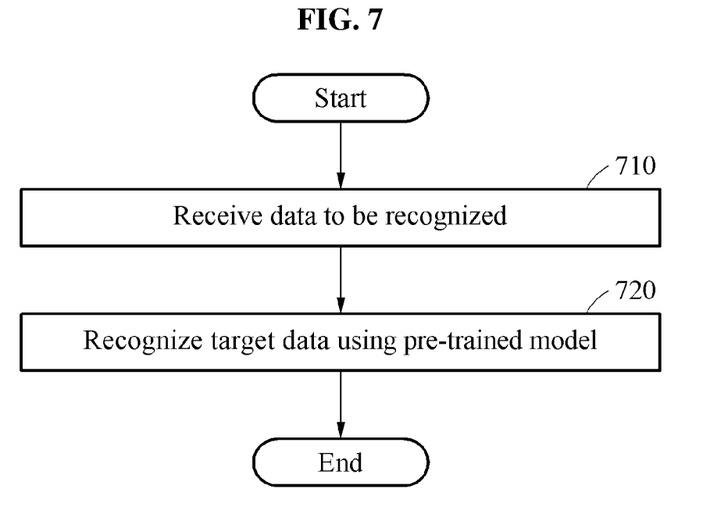
FIG. 7 illustrates an example of a data recognition method.

FIG. 7 illustrates an example of a data recognition method.

The data recognition method is performed by a processor of a data recognition apparatus.

In operation 710, the data recognition apparatus receives data to be recognized. In operation 720, the data recognition apparatus recognizes target data using a pre-trained model. The pre-trained model is the student model described above. Since a training method of the student model is the same as that described above, the descriptions of FIGS. 1-6 are also applicable to FIG. 7 and are incorporated herein by reference. Thus, the above description may not be repeated here and is omitted for brevity.

Figure 8:
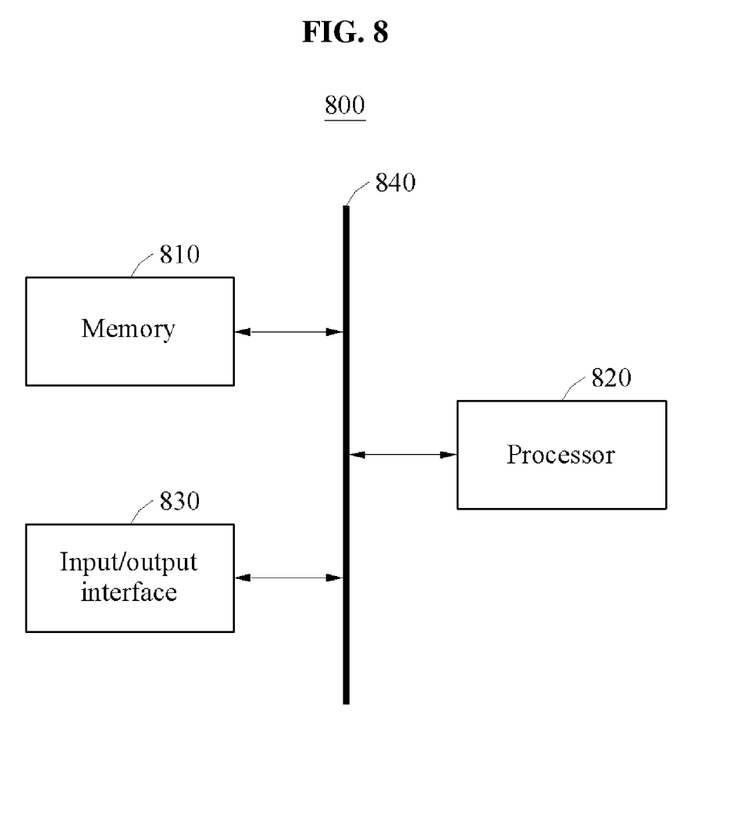
FIG. 8 illustrates an example of an apparatus for processing data based on a neural network.

FIG. 8 illustrates an example of an apparatus for processing data based on a neural network.

Referring to FIG. 8, a data processing apparatus 800 includes a memory 810, a processor 820, and an input/output interface 830. The memory 810 and the processor 820 communicate with each other via a bus 840.

The data processing apparatus 800 is an apparatus for processing input data and outputting the processed data, and may be one of the model training apparatus and the data recognition apparatus described herein.

The memory 810 includes instructions to be read by a computer. The processor 820 performs the aforementioned operations in response to the instructions stored in the memory 810 being executed in the processor 820. The processor 820 may be a data processing device configured as hardware having a circuit in a physical structure to implement desired operations. For example, the desired operations may include codes or instructions included in a program. For example, the data processing device configured as hardware may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration. Further details regarding the processor 820 is provided below.

The memory 810 is a volatile memory or a non-volatile memory. The memory 810 stores a parameter of a student model. In addition, the data processing apparatus 800 processes the operations described herein. Further details regarding the memory 810 is provided below.

In an example, the input/output interface 830 may be a display that receives an input from a user or provides an output. In an example, the input/output interface 830 may function as an input device and receives an input from a user through a traditional input method, for example, a keyboard and a mouse, and a new input method, for example, a touch input, a voice input, and an image input. Thus, the input/output interface 830 may include, for example, a keyboard, a mouse, a touchscreen, a microphone, and other devices that may detect an input from a user and transmit the detected input to the data processing apparatus 800.

In an example, the input/output interface 830 may function as an output device, and provide an output of the data processing apparatus 800 to a user through a visual, auditory, or tactile channel. The input/output interface 830 may include, for example, a display, a touchscreen, a speaker, a vibration generator, and other devices that may provide an output to a user.

However, the input/output interface 830 are not limited to the example described above, and any other displays, such as, for example, computer monitor and eye glass display (EGD) that are operatively connected to the data processing apparatus 800 may be used without departing from the spirit and scope of the illustrative examples described. In an example, the input/output interface 830 is a physical structure that includes one or more hardware components that provide the ability to render a user interface, render a display, and/or receive user input.

The data processing apparatus 800 may be implemented in various electronic devices, such as, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a head-up display (HUD), a handheld game console, an e-book, a television (TV), a high definition television (HDTV), a smart TV, a smart appliance, a smart home device, or a security device for gate control, various Internet of Things (IoT) devices, an autonomous vehicle, an automatic or autonomous driving system, an intelligent vehicle, an advanced driver assistance system (ADAS), or any other device capable of wireless communication or network communication consistent with that disclosed herein. In an example, the data processing apparatus 800 recognizes target data using a pre-trained model. In an example, the pre-trained model is the student model described above.

In an example, the data processing apparatus 800 may be connected to an external device, such as, for example, a personal computer (PC) or a network, via an input/output device of the external device, to exchange data with the external device.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of training a model. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of training a model, the method comprising:
   acquiring first output data of a student model for first input data and second output data of a teacher model for second input data; and
   training the student model such that the first output data and the second output data are not distinguished from each other,
   wherein the student model and the teacher model have different structures, and
   wherein the first input data is one of text data and speech data and the second input data is the other of the text data and speech data.

2. The method of claim 1, wherein the student model and the teacher model are configured to process different tasks.

3. The method of claim 1, wherein the first input data and the second input data are different types of data.

4. The method of claim 1, wherein the first input data and the second input data are unlabeled data.

5. The method of claim 1, wherein the training of the student model comprises:
   training the student model such that the first output data and the second output data are not distinguished from each other by a discriminator model and
   the discriminator model is configured to distinguish between the first output data and the second output data.

6. The method of claim 1, wherein the first output data and the second output data are a same type of data.

7. The method of claim 1, wherein the student model is a speech recognition model and
   the teacher model is a language model that outputs text data based on an expression of a domain.

8. The method of claim 1, wherein the first input data, the second input data, the first output data, and the second output data are sequence data.

9. The method of claim 1, wherein the training of the student model comprises:
   determining an adversarial loss based on a degree to which the first output data and the second output data are distinguished from each other and training the student model to reduce the adversarial loss.

10. A non-transitory computer-readable storage medium storing instructions that, when executed by a processor, cause the processor to perform the method of claim 1.

11. An apparatus for training a model, the apparatus comprising:

a processor configured to acquire first output data of a student model for first input data and second output data of a teacher model for second input data and to train the student model such that the first output data and the second output data are not distinguished from each other; and a memory configured to store a parameter of the student model, wherein the student model and the teacher model have different structures, and wherein the first input data is one of text data and speech data and the second input data is the other of the text data and speech data.

12. The apparatus of claim 11, wherein the student model and the teacher model are configured to process different tasks.

13. The apparatus of claim 11, wherein the first input data and the second input data are different types of data.

14. The apparatus of claim 11, wherein the first input data and the second input data are unlabeled data.

15. The apparatus of claim 11, wherein the processor is further configured to train the student model such that the first output data and the second output data are not distinguished from each other by a discriminator model, and the discriminator model is configured to distinguish between the first output data and the second output data.

16. The apparatus of claim 11, wherein the first output data and the second output data are a same type of data.

17. The apparatus of claim 11, wherein the student model is a speech recognition model, and the teacher model is a language model that outputs text data based on an expression of a domain.

18. An apparatus for training a model, the apparatus comprising;

a memory configured to store a student model, a teacher model, and a discriminator model; and a processor configured to acquire first output data of the student model for first input data and second output data of the teacher model for second input data, train the discriminator model to distinguish between the first output data and the second output data, and train the student model to minimize a distinction between the first output data and the second output data at the discriminator mode, wherein the first input data is one of text data and speech data and the second input data is the other of the text data and speech data.

19. The apparatus of claim 18, wherein a number of hidden layers of the student model is lesser than a number of hidden layers of the teacher model.

20. The apparatus of claim 18, wherein the first input data and the second output data comprise unlabeled data.

* * * * *